J. ROSSELL.
PIPE COUPLING.
APPLICATION FILED DEC. 7, 1912.
1,071,585.  
Patented Aug. 26, 1913.
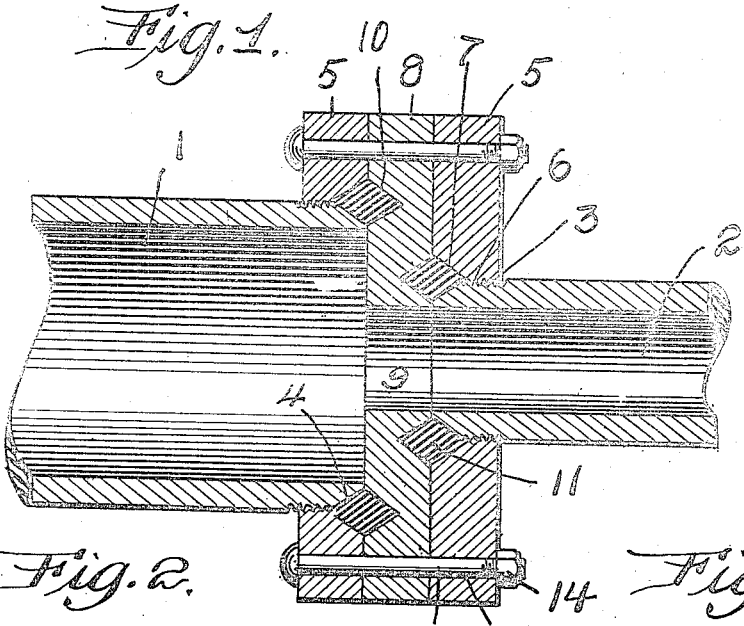
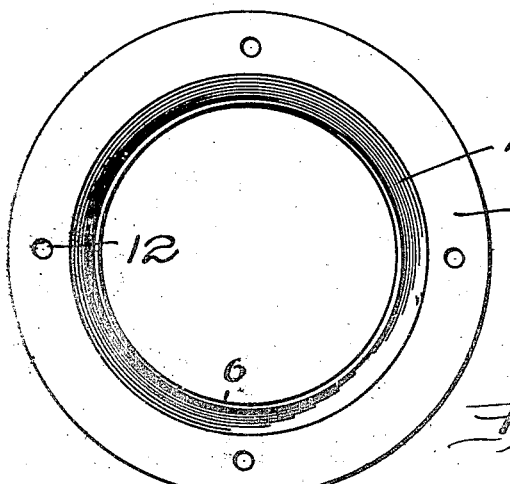
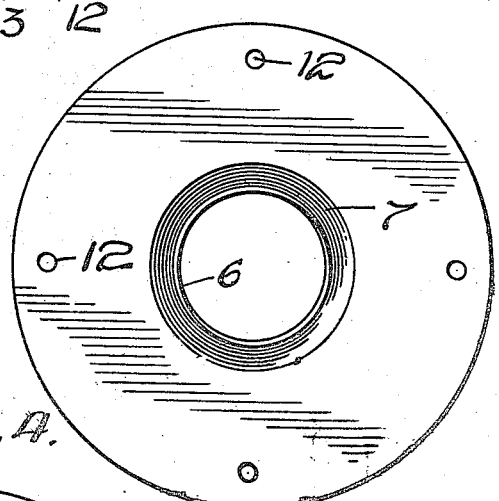
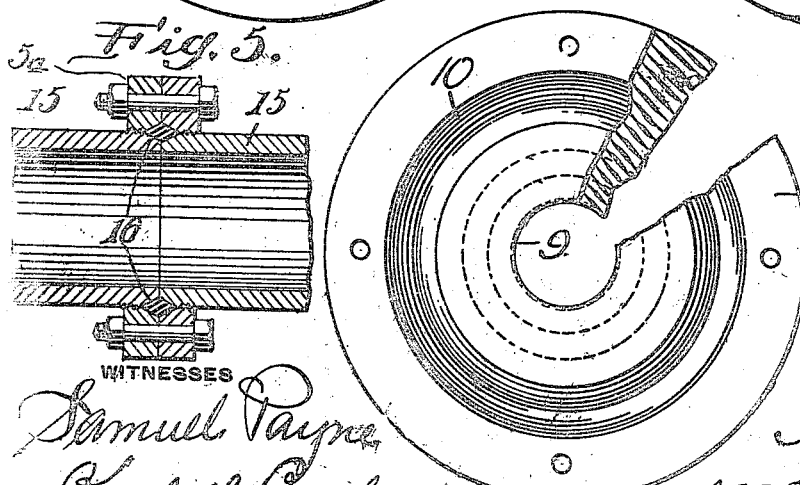
WITNESSES  
Samuel Payne  
Karl H. Butler
INVENTOR  
J. Rossell
ATTORNEYS

UNITED STATES PATENT OFFICE.

JOE ROSSELL, OF PITTSBURGH, PENNSYLVANIA.

PIPE-COUPLING.

1,071,585.  Specification of Letters Patent.  Patented Aug. 26, 1913.

Application filed December 7, 1912. Serial No. 735,563.

*To all whom it may concern:*

Be it known that I, JOE ROSSELL, a citizen of the United States of America, residing at Pittsburgh, in the county of Allegheny and State of Pennsylvania, have invented certain new and useful Improvements in Pipe-Couplings, of which the following is a specification, reference being had therein to the accompanying drawing.

This invention relates to pipe couplings, and the primary object of my invention is the provision of positive and reliable means, as hereinafter set forth, for establishing a nonleakable joint between pipes of various sizes and materials.

Another object of this invention is to provide a pipe coupling consisting of comparatively few parts that are inexpensive to manufacture, easy to install, strong and durable, and highly efficient for the purposes for which they are intended.

A further object of this invention is to provide a pipe coupling that can be advantageously used in connection with ammonia pipes and other conduits that require a metallic packing.

With the above and other objects in view the invention resides in the novel construction, combination, and arrangement of parts to be hereinafter specifically described and then claimed.

Reference will now be had to the drawing, wherein:—

Figure 1 is a longitudinal sectional view of a pipe coupling in accordance with this invention, Fig. 2 is a front elevation of one of the heads of the coupling, Fig. 3 is a similar view of another head of the coupling, Fig. 4 is a front elevation of an intermediate head of the coupling, and Fig. 5 is a longitudinal sectional view of a direct coupling.

Further describing my invention in detail with reference to the accompanying drawing, wherein like numerals denote corresponding parts throughout: 1 and 2 denote, by the way of an example, pipes of different diameters and the ends of said pipes are exteriorly screw threaded, as at 3 and beveled, as at 4.

5 denotes circular end heads having concentric openings 6 with the walls thereof screw threaded to receive the ends of the pipes 1 and 2. The heads 5 have the inner sides thereof, at the openings 6, beveled, as at 7, the annular beveled surfaces being disposed at an angle to the beveled ends of the pipes 1 and 2.

8 denotes an intermediate circular head having a concentric opening 9 registering with the bore of the pipe 2. The intermediate head 8 has the sides thereof provided with annular grooves 10 that are V-shaped in cross section, these grooves confronting the beveled ends of the pipes 1 and 2 and the beveled annular surfaces of the end heads 5.

11 denotes gaskets or packing rings that are diamond-shaped in cross section, said gaskets being arranged in the grooves 10 to engage the beveled ends of the pipes 1 and 2 and the beveled surfaces 7 of the end heads. The gaskets 11 can be made of metal, rubber, leather or other yieldable and compressible material.

12 denotes registering openings formed in the heads 5 and 8, adjacent to the edges thereof and arranged in said openings are bolts or tie rods 13 provided with nuts 14, said bolts and nuts constituting means for clamping the heads 5 and 8 together.

From the foregoing it will be observed that through the medium of the intermediate head 8 and the gaskets thereof the ends of the pipes 1 and 2 are securely connected to form a non-leakable connection. The joint or coupling constitutes a reduction and can be utilized in this and other connections.

In Fig. 5 of the drawing, there is illustrated what I term a direct coupling, that is wherein pipes 15 are of the same diameter. In this instance two heads 5$^a$, similar to the heads 5 are used with a gasket 16 interposed between the ends of the pipes and said heads, the gasket being made of a suitable material.

I attach considerable importance to the shape of the gaskets, as one edge of each gasket engages the threads of a pipe and when said gaskets are compressed, the gaskets insure a non-leakable connection at the threaded portion of each pipe. In other words, the gaskets have a width slightly greater than the space into which they are to be fitted, whereby when the heads are connected together, the gaskets will be compressed and snugly fit in the space.

The preferred embodiments of the invention have been illustrated but it is to be understood that the structural elements are susceptible to such changes as fall within the scope of the appended claims.

What I claim is:—

1. A pipe coupling comprising a flat circular member having a centrally disposed opening and each face provided with an annular groove V-shaped in cross section, a disk secured to each face of said member and formed with an opening, one end of the wall of the opening of each disk being beveled and forming a continuation of one wall of the groove, the remaining portion of the wall of the opening of the disk being screw threaded, the openings of the disks communicating with the opening in said member, pipes having their ends secured in the opening of the disks and beveled to form a continuation of the other walls of said grooves, and compressible gaskets mounted in said grooves and engaging the disk and pipes.

2. A pipe coupling comprising a flat circular member having a centrally disposed opening and each face provided with an annular groove V-shaped in cross section, a disk secured to each face of said member and formed with an opening, one end of the wall of the opening of each disk being beveled and forming a continuation of one wall of the groove, the remaining portion of the wall of the opening of the disk being screw threaded, the openings of the disks communicating with the opening in said member, pipes having their ends secured in the openings of the disk and beveled to form a continuation of the other walls of said grooves, compressible gaskets mounted in said grooves and engaging the disk and pipes, the opening of one of said disks being of greater diameter than the opening in the other of said disks, and the groove in one face of said member positioned in closer proximity to the opening of the member than the groove in the other face.

In testimony whereof I affix my signature in the presence of two witnesses.

JOE ROSSELL.

Witnesses:
J. P. APPLEMAN,
KATHERINE ERRETT.